US012572901B2

(12) United States Patent
Srivastava

(10) Patent No.: US 12,572,901 B2
(45) Date of Patent: Mar. 10, 2026

(54) AUTOMATED TRANSACTION HANDLING USING SOFTWARE BOTS

(71) Applicant: Zoom Video Communications, Inc., San Jose, CA (US)

(72) Inventor: Sachin Srivastava, San Ramon, CA (US)

(73) Assignee: Zoom Communications, Inc., San Jose, CA (US)

( * ) Notice: Subject to any disclaimer, the term of this patent is extended or adjusted under 35 U.S.C. 154(b) by 27 days.

(21) Appl. No.: 17/977,753

(22) Filed: Oct. 31, 2022

(65) Prior Publication Data

US 2024/0144200 A1     May 2, 2024

(51) Int. Cl.
*G06Q 40/00* (2023.01)
*G06F 21/31* (2013.01)
*G06Q 20/02* (2012.01)

(52) U.S. Cl.
CPC ............. *G06Q 20/02* (2013.01); *G06F 21/31* (2013.01); *G06F 2221/2115* (2013.01)

(58) Field of Classification Search
CPC ........ G06Q 40/00; G06Q 20/02; G06F 21/31; G06F 2221/2115
See application file for complete search history.

(56) References Cited

U.S. PATENT DOCUMENTS

| | | | | |
|---|---|---|---|---|
| 2018/0278552 A1* | 9/2018 | Quock | .............. | G06Q 20/4016 |
| 2018/0330364 A1* | 11/2018 | Driscoll | ................. | G06Q 20/36 |
| 2019/0297158 A1* | 9/2019 | Olenoski | ................ | G06Q 20/02 |
| 2019/0347668 A1* | 11/2019 | Williams | ............... | G06N 5/046 |
| 2021/0288926 A1* | 9/2021 | Golding | ................ | G06N 3/006 |

OTHER PUBLICATIONS

Towards the Management of B2C and B2B E-commerce transaction failures through bot-mediated component W Nwankwo, AS Olayinka—Trans. Nigerian Assoc. Math. Phys, 2019—academia.edu (Year: 2019).*

* cited by examiner

*Primary Examiner* — Olabode Akintola
(74) *Attorney, Agent, or Firm* — Kilpatrick Townend & Stockton LLP

(57) ABSTRACT

The present disclosure relates to systems and methods for using software bots for automated transaction handling. The systems and methods include receiving an email message about an upcoming transaction. The email message includes a link to a software bot that is programmed to automate the transaction in response to receiving a selection of the link to the software bot. Thereafter, the link selection causes a call to the software bot to execute the transaction. The software bot performs the transaction automatically on behalf of the user and provides confirmation of completion of the transaction.

20 Claims, 9 Drawing Sheets

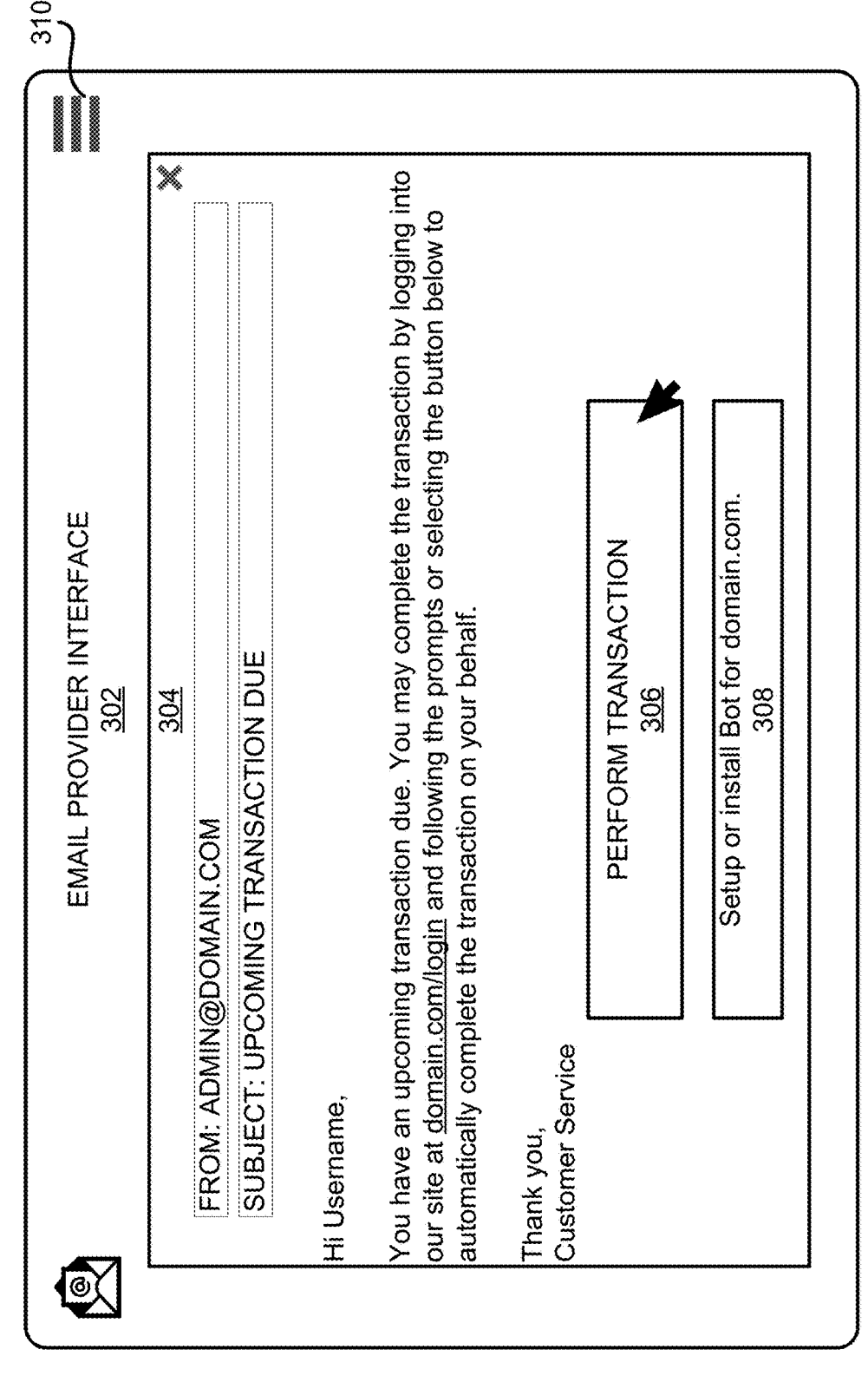

EMAIL PROVIDER INTERFACE
302

304

FROM: ADMIN@DOMAIN.COM

SUBJECT: UPCOMING TRANSACTION DUE

Hi Username,

You have an upcoming transaction due. You may complete the transaction by logging into our site at domain.com/login and following the prompts or selecting the button below to automatically complete the transaction on your behalf.

Thank you,
Customer Service

PERFORM TRANSACTION
306

Setup or install Bot for domain.com.
308

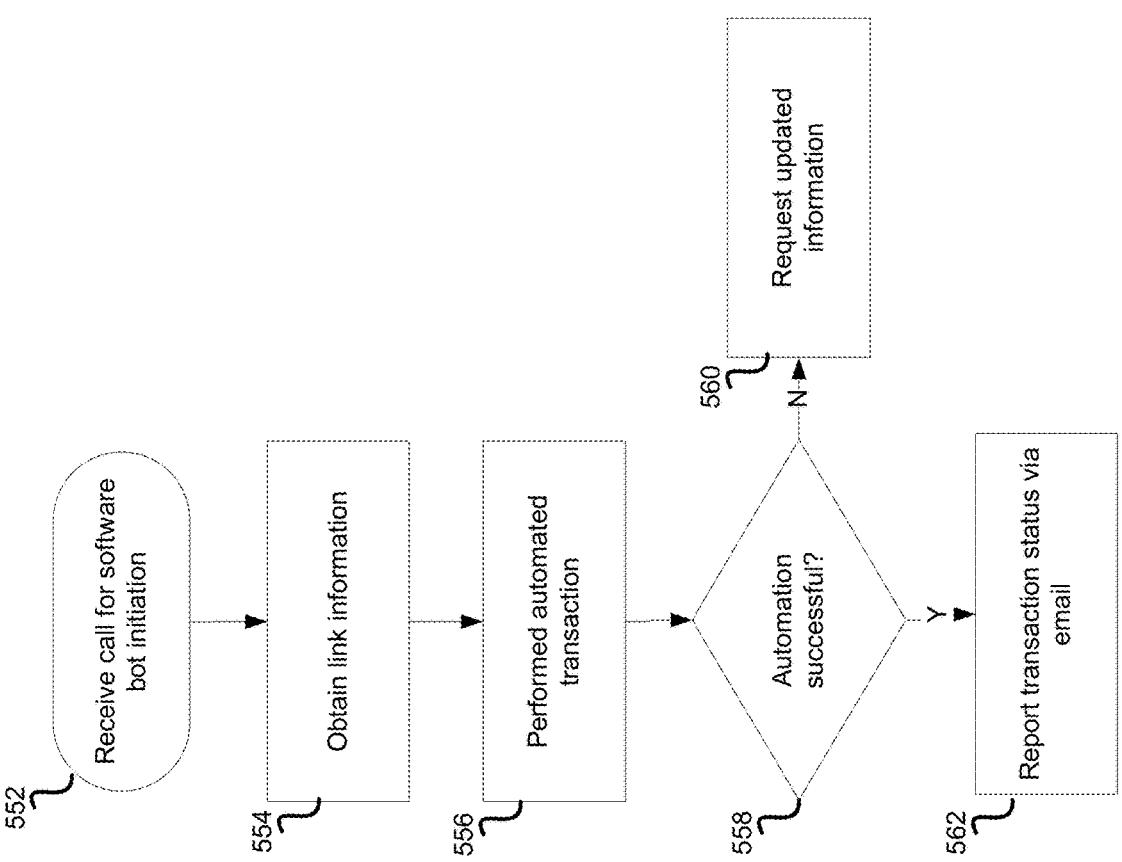
FIG. 5C

AUTOMATED TRANSACTION HANDLING USING SOFTWARE BOTS

FIELD

The present disclosure relates generally to referencing software bots, and more particularly, to providing software bots for automated transaction handling.

BRIEF DESCRIPTION OF THE DRAWINGS

FIG. 3 is an illustration depicting an example automated transaction handling system in accordance with various embodiments.

FIG. 3 is an illustration of an example graphical user interface ("GUI") in accordance with various embodiments.

FIGS. 5A, 5B, and 5C are flow charts depicting a process for using automated transaction handling system in accordance with various embodiments.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to providing software bots for automated transaction handling. The software bots can be provided in a combination of implementations. The software bots can be created by a vendor, a user, or a third-party service provider to automate a specific transaction or task. For example, a vendor can create a software bot to automate payment of a bill which would normally be manually completed by a user on their website. In some embodiments, activation of the software bots can be implemented through electronic mail (email), which provides a mechanism for launching the software bots to complete an automated transaction. For example, the vendor can generate an email including a link to activate a software bot to execute a pre-programmed automated transaction. Once the link is selected by the user, the software bot would launch and operate in the background to complete the requested transaction (e.g., bill payment).

The software bot can be programmed by the vendor to carry out a specific transaction or collection of transactions (e.g., payment, scheduling, purchase tickets, signatures, etc.) and each vendor could have their own software bot or collection of software bots to carry out different tasks differentiated by the coding behind the link in the email. The software bot would complete the transaction(s) without the user's involvement or with only minimal user involvement (e.g., approving a signature) and provide confirmation results back to the user. The email provider delivering the message containing the launching mechanism for the software bot can also provide security, such as verifying that the source of the email is from a secure trusted source. If the source email is secure and trustworthy, then the link information and user credential can be provided to the software bot (e.g., to log into the vendor's webpage) to complete the transaction.

System Overview

Figure 1:
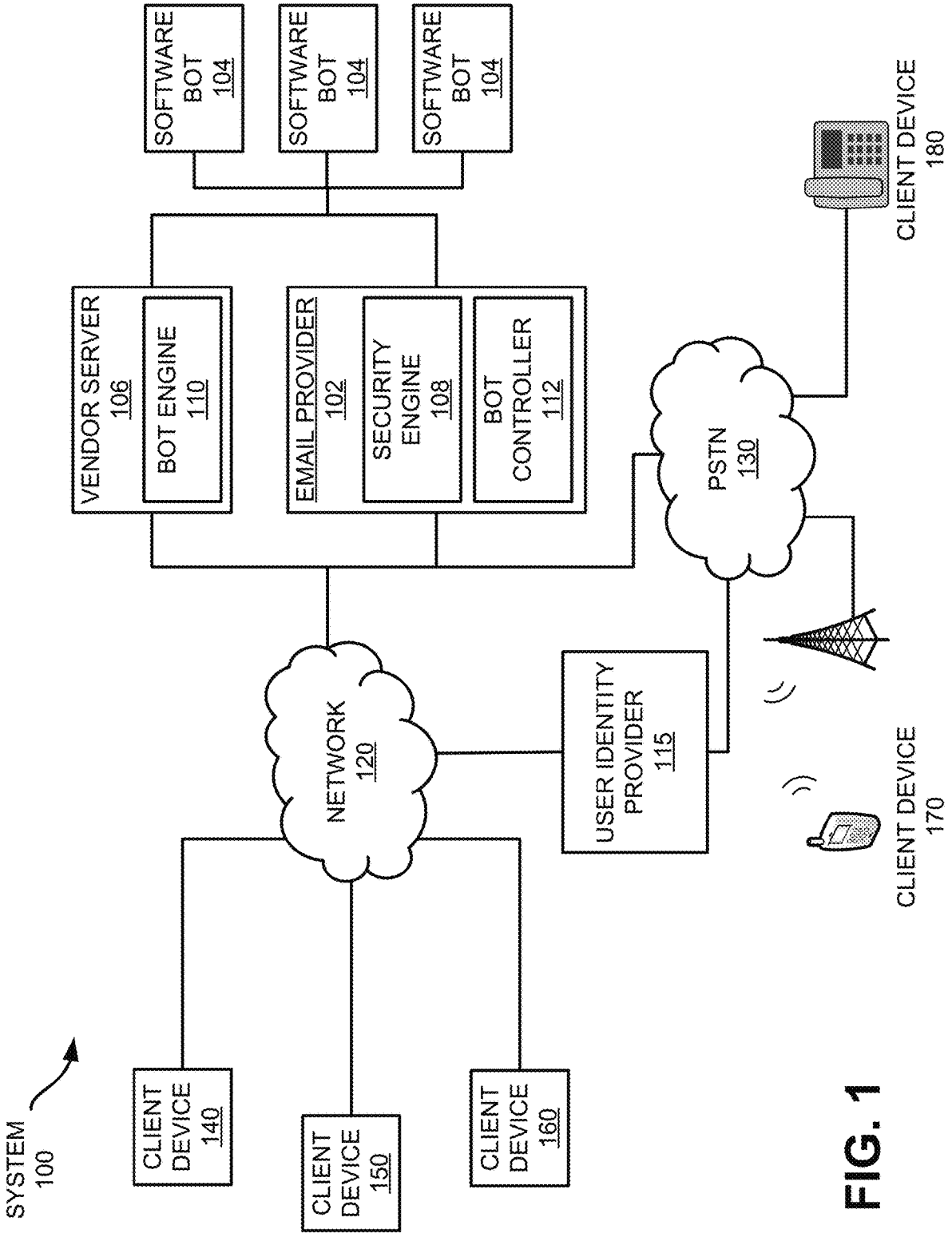
FIG. 1 is an illustration depicting an example automated transaction handling system in accordance with various embodiments.

Referring now to FIG. 1, an example system 100 that provides automated transaction handling functionality to various client devices is depicted. The system 100 includes a combination of an email provider 102, a plurality of specially programmed software bots 104, and a plurality of vendor server(s) 106 configured to deliver automated transaction support to various client devices 140, 150, 160, 170, 180. The components of the system 100 are connected to multiple communication networks 120, 130, through which the various client devices 140, 150, 160, 170, 180 can participate in the automated transaction handling created by the system 100. For example, the components of the system 100 can be located within a combination of private network and a public network, e.g., the internet, so it may be accessed by anyone. Each client device 120-150 communicates with the email provider 102 over a communications network, such as the internet for client devices 120-140 or the PSTN for client device 150.

Figure 2:
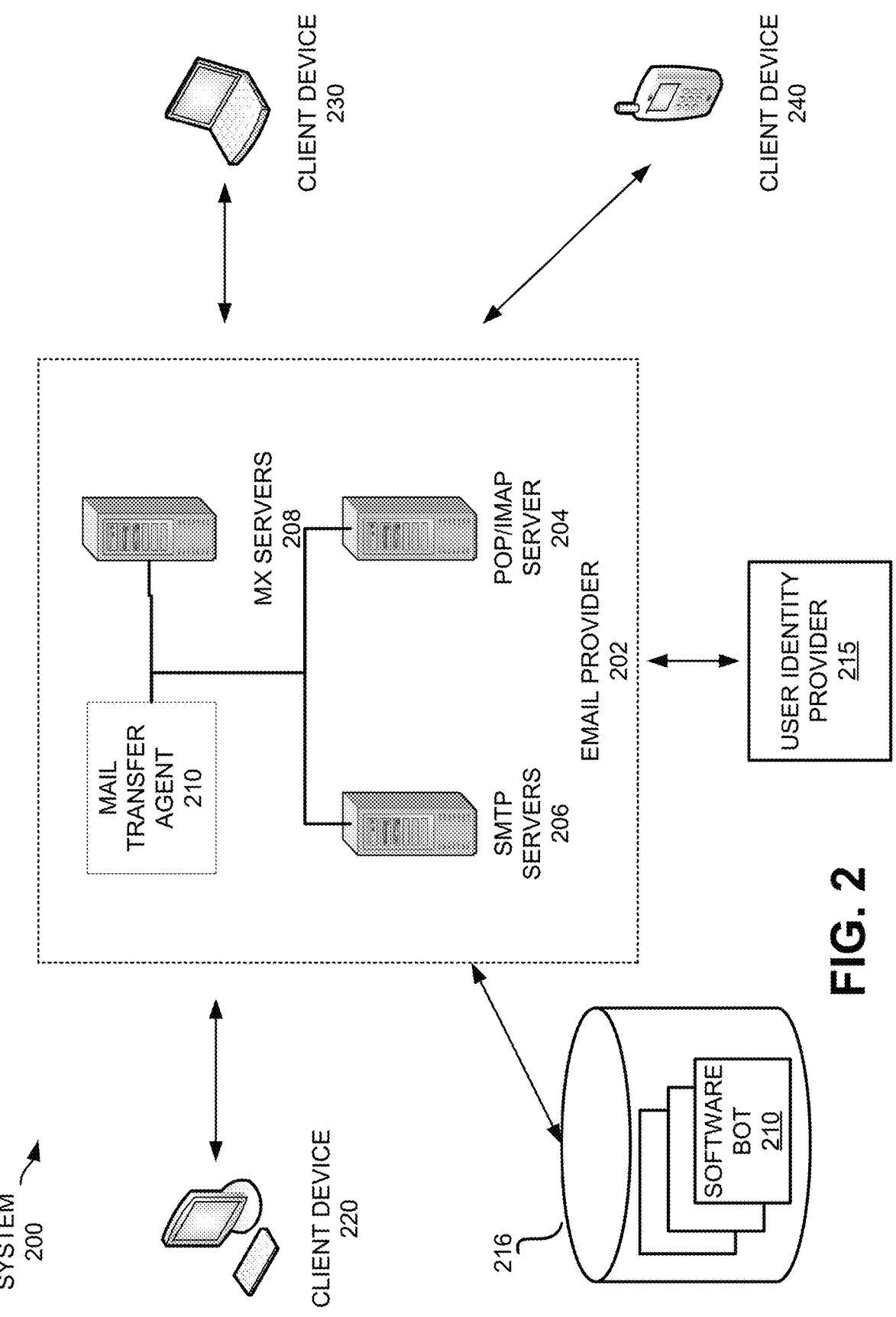
FIG. 2 is an illustration depicting an example automated transaction handling system in accordance with various embodiments.

In some embodiments, an email provider 102 enables the delivery mechanism for enabling and launching software bots 104 to complete the automated transactions. The email provider 102 can include any combination of components to provide an email service to one or more users, via client devices 140-180. FIG. 2, described below, provides a more detailed description of an example architecture and functionality for the email provider 102. The email provider can include any combination of architectures designed to provide secure access to emails.

In some embodiments, the email provider 102 can include or otherwise coordinate with a security engine 108 for providing identification verification and security for transactions within the system 100. For example, the email provider 102 can provide a secure platform which can be setup for identity and access management system (e.g., Okta or Azure) implementing a combination of mechanisms such as encryption, multi-factor authentication (MFA), single sign on (SSO), Security Assertion Markup Language (SAML)/Simple Key-Management for Internet Protocol (SKIP) protocols, etc.

Figure 4A:
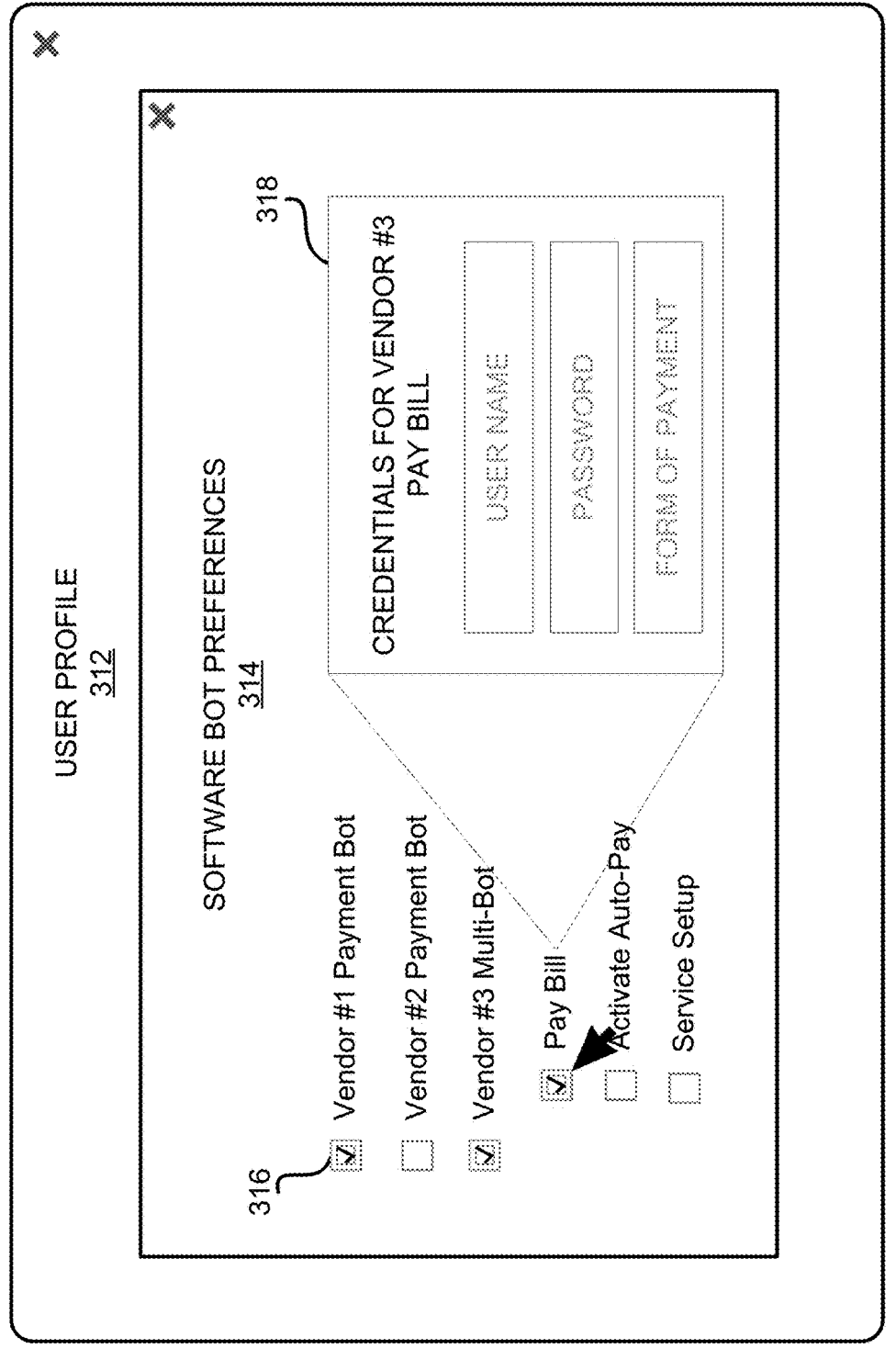
FIGS. 4A and 4B are illustrations of example graphical user interfaces ("GUI") in accordance with various embodiments.

In some embodiments, the email provider 102 can include or otherwise coordinate with a bot controller 112 for installing and managing one or more software bots 104 based on user preferences (e.g., as shown in FIG. 4A). A user can interact with their user profile 312 within the email provider 102 to customize which software bots 104 they would like to be launchable through their email and what transactions the software bots 104 can perform. For example, a user can use their user profile 312 to install new software bots for new vendor transactions, enable existing software bots, disable existing software bots, uninstall software bots, select/deselect subsections of transaction types by each of the software bots, etc.

In some embodiments, the email provider 102 can store and manage user credentials for accessing one or more of the vendor servers 102. The user credentials can be stored and managed within a user profile in such a manner to allow automatic sign ins for user account services hosted by the vendor server 106. For example, with the saved credentials, the email provider 102 allows identity providers (IDPs) to be logged in from the user's email directly. In some embodiments, the email provider 102 can be a specialized to handle the utilization of software bots 104 and coordinating credentials with the software bots 104 and vendor servers 106. For example, the stored user credentials can be shared or provided to the software bots 104 to allow the software bots 104 to login into accounts on the user's behalf. In some embodiments, the user profile can include preferences and settings for adding, enabling, and controlling software bots 104, for example, as depicted in FIG. 4A. For example, the email provider 102 acts as the service provider which adds the requested software bots 104 to the user's profile so the software bots 104 can use SSO to access the user's accounts at other locations (e.g., vendors sites). The user profile within the email provider 102 can also be used to set security preferences and levels. For example, the user profile can be used to configure what credentials the software bots 104 can access and what level of sign on can be used. For example, the user can select SSO or MFA for software bots 104.

In some embodiments, the email provider 102 can be a specialized email platform with higher levels of security for providing encryption of transactions, spam protection, phishing protection, source validation, etc. The email provider 102 being a specialized secure platform can enable the email provider 102 to implement and/or coordinate the use of software bots 104 while reducing the risk of malicious actions. The email provider 102 as a specialized platform can be provided as a regular email service (e.g., free) or as an add-on or premium version (e.g., paid) to a base email platform.

In some embodiments, the vendor server 106 can include a server that hosts one or more webpages or applications that are designed for providing one or more services or accounts for a user. The vendor server 106 can include any combination of components to provide services hosted by a vendor, to be provided to one or more users, via client devices 140-180. The vendor server 106 can be owned, leased, subscribed, etc. by a vendor and can include at least a login page enabling user's to access an account and/or the services provided by the vendor. The vendor can include any combination of service providers. For example, the vendor can be a credit card company, utility company, service company, sales company, etc. In some embodiments, the vendor provides one or more services that require a user to access their website or application to manually complete a transaction. The transactions can include any combination of transactions that can be completed over the internet. For example, the transactions can include, but are not limited to, credit card payments, utility bills, purchasing tickets, purchasing a subscription or service, updating preferences associated with a user account (e.g., parameters on credit card, autopay, notifications, monitoring, etc.).

In some embodiments, the vendor and/or the vendor server 106 can generate and/or coordinate the generation of emails to be provided to users that are customers, clients, subscribers, etc. related to one or more transactions to be performed by the user. The emails can be generated with any combination of content, for example, as discussed with respect to FIG. 3. Once generated, the email(s) can be sent to targeted users. The target users can be determined based on an automated process based on different milestones, events, triggers, etc. For example, the vendor can generate and send emails whenever a due date for transaction associated with a given user is approaching. Users may receive emails (e.g., via email provider 102) requesting an action to complete a transaction (e.g., payment for a credit card) from various vendors or service providers. In some embodiments, one or more of the transactions can be completed in an automated fashion using a specially designed software bot 104, as discussed in greater detail herein.

In some embodiments, the vendor and/or the vendor server 106 can generate emails with a button or link (e.g., button 306) associated with the vendor's webpage for completing one or more transactions. The button or link can include or otherwise be associated with any combination mechanism for accessing a vendor's webpage to complete a transaction. For example, the button or link can include an embedded hyperlink to the vendor's webpage, such that selection of the button or link by the user (e.g., via client device) can cause a web browser or other application to launch and load a web address associated with the button or link. From there, the user can navigate the website and complete the requested action. For example, the user would log in, access a payment screen, enter payment information, and submit the payment. In some embodiments, the button or link can include a function or call to another program such that selection of the button or link by the user can initiate a call to a specific software bot 104 associated with the vendor. The function or call to the software bot 104 can be performed using any combination of mechanisms. For example, the call can include instructions from the button or link to perform a particular transaction.

In some embodiments, the button or link can be encrypted and formatted to store information related to a transaction in a unique data structure, such that only the specific software bot 104 associated with that transaction will be able to decrypt and interpret the information within the unique data structure. For example, when a user selects the link or button, the encrypted value can be provide from the software bot 104 back to the email vendor so that the software bot 104 can be provided with the information necessary to decode and access the transaction information. In some embodiments, the button or link can include or otherwise be associated with a combination of information associated with the user, the user's account, a specific transaction for that account, etc. For example, the button or link can include any combination of a user identifier, account number, invoice number, invoice amount, transaction identifier, transaction type, etc.

In some embodiments, the button or link can include or otherwise be associated with a transaction generated by the vendor for the recipient user. The button or link can include a unique identifier associated with a particular transaction for the user to execute. The unique identifier can be part of the web address or separate metadata. For example, the unique identifier can be part of a query, parameter, fragment, etc. portion of a URL address. In some embodiments, the unique identifier can be used by a software bot 104 to automate the transaction for the user.

In some embodiments, the vendor server 106 can include or otherwise coordinate with a bot engine 110 for generating, implementing, and managing the software bots 104. The bot engine 110 can create one or more software bots 104 that are designed to automated one or more transactions at the vendor server 106 and are accessible and/or launchable through the email provider 102. The software bots 104 can include any combination of a software programs that operates on the Internet and perform repetitive tasks. In some embodiments, the software bots 104 can be launched via an email message and will operate in a manner similar an app or a program, which can be called with certain parameters to securely accomplish a transaction or task. The software bots 104 can be specifically programmed for completing transactions specific to the vendor website and/or the vendor server 106.

The software bots 104 can be generated, stored, and managed using any combination of infrastructure. For example, as shown in FIG. 2, the software bots 104 can be stored in a remote database accessible by the email provider 102 and/or vendor server 106 or can be hosted by the email provider 102 and/or vendor server 106 themselves. In another example, the software bots 104 can be installed on a client device 140-160, such that a user can select and install one or more software bots 104. The software bots 104 could be run directly on the client computer (e.g., selecting an executable) and/or can be called in response to accessing a link through an email provider 102 and/or vendor server 106. The software bots 104 can also be created and stored by a third part service provider that is accessible by any combination of the email provider 102 and/or vendor server 106 via a secure connection. The software bots 104, operation of the email provider 102, and the vendor server 106 can be owned and managed by any combination of components to facilitate the communication between the email provider 102 and the vendor 106 that offers the software bot 104 services. For example, the software bots 104, operation of the email provider 102, and the vendor server 106 can be maintained and operated within any combination of a client/server infrastructure, a cloud computing infrastructure, an edge computing infrastructure, etc.

The system 100 optionally also includes one or more user identity providers, e.g., user identity provider 115, which can provide user identity services to users of the client devices 140-160 and may authenticate user identities of one or more users to the email provider 102 and/or the vendor server 106. In some embodiments, the user identity provider 115 is operated by a different entity than the email provider 102, though in some examples, they may be the same entity. The email provider 102 allows clients 140-160 to compose, send, and receive electronic mail (email) and initiate automated transaction handling system through email. A user identity provider 115 may be any entity trusted by the other components of the system 100 that can help identify a user to the rest of the system 100. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the email provider 102.

When the user accesses the email provider 102 and/or the vendor server(s) 106 using a client device 170-180, the email provider 102 and/or the vendor server(s) 106 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the email provider 102 and/or the vendor server(s) 106 either provides or denies access to its services, respectively. In some embodiments, the user identify provider 115 can be integrated as part of one or more of the components within the system 100. For example, each of the email provider 102 and/or the vendor server(s) 106 can have their own user identify provider 115 so that users can securely log in to access their email or vendor services, respectively.

To provide such functionality, one or more client devices 140-180 may communicate with the email provider 102, the plurality of software bots 104, and the vendor server(s) 106 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to any of the email provider 102, the plurality of software bots 104, and the vendor server(s) 106 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, and smartphones. Each of these devices may provide both audio and video capabilities and may enable one or more users to participate in automated transaction handling provided by the system 100.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the email provider 102, the plurality of software bots 104, and the vendor server(s) 106. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-180, these devices 140-180 contact one or more of the email provider 102, the plurality of software bots 104, and the vendor server(s) 106 using network 120 and may provide information to the email provider 102, the plurality of software bots 104, and the vendor server(s) 106 to access functionality provided by the system 100, such as automated task handling.

In some embodiments, each of the email provider 102 and/or the vendor server(s) 106 may allow client devices 140-180 to encrypt their respective data to help improve privacy in their communications. Encryption may be provided between the client devices 140-180 and the email provider 102 and/or the vendor server(s) 106 or it may be provided in an end-to-end configuration where data transmitted by the client devices 140-180 is not decrypted until it is received by another client device 140-180. Encryption may also be provided during only a portion of a communication, for example encryption may be used for otherwise unencrypted communications that cross international borders.

Client-to-server encryption may be used to secure the communications between the client devices 140-180 and the email provider 102 and/or the vendor server(s) 106, while allowing the email provider 102 and/or the vendor server(s) 106 to access the decrypted data to perform certain processing, such as validating or verifying sources of data (e.g., email addresses). End-to-end encryption may be used to keep the data entirely private to the participants without any worry about the email provider 102 and/or the vendor server(s) 106 having access to the substance of the data. Any suitable encryption methodology may be employed, including key-pair encryption of the data streams. Thus, the client devices 140-180 may securely communicate with each other when sending email through the system 100. In some embodiments, end-to-end encryption is implemented when operating the software bots 104.

Referring now to FIG. 2, an example system 200 in which an email provider 202 is used to provide automated transaction handling functionality to various client devices 220, 230, 240 is depicted. The client devices 220-240 include any combination of computing devices 220-240 capable of interacting with an email provider to receive and send emails and to interact with vendor servers over the internet (e.g., via web browser). Each client device 220-240 communicates with the email provider 202 over a communications network, such as the internet for client devices 220-240 or the PSTN for client device 250, generally as described above with respect to FIG. 1. The email provider 202 is also in communication with one or more user identity providers 215, which can authenticate various users to the email provider 202 generally as described above with respect to FIG. 1. By using the example system 100 shown in FIG. 1, users can access email services and initiate automated transaction handling using their respective client devices 220, 230, 240.

In this example, the email provider 202 employs multiple different servers (or groups of servers) to provide different aspects of email functionality, thereby enabling the various client devices 220-240 to access email. The email provider 202 can include any combination of components for facilitating an email service to a plurality of users. The components can include, but are not limited to simple mail transfer protocol (SMTP) servers, post office protocol (POP)/internet message access protocol (IMAP) servers, domain name system (DNS) servers, mail transfer agent (MTA), mail exchanger (MX) servers, etc. For example, as depicted in FIG. 2, the email provider 202 can include one or more POP/IMAP servers 204, one or more SMTP servers 206, one or more MX servers 208, and one or more MTAs 210 for coordinating access and transmission of emails between client devices 220-240. Each of the POP/IMAP servers 204, SMTP servers 206, MX servers 208, and MTAs 210 are connected to one or more communications networks to enable them to collectively provide access to email services to the client devices 220-240.

The POP/IMAP servers 204, SMTP servers 206, MX servers 208, and MTAs 210 can be combined into any number of servers performing one or more functions for each of the POP/IMAP servers 204, SMTP servers 206, MX servers 208, and MTAs 210. In addition, the various components of the email provider 202 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more SMTP servers 206 and POP/IMAP servers 204 to enable client devices in the same geographic region to have a high-quality connection into the email provider 202 via local servers to send and receive emails, rather than connecting to servers located in a different country or on a different continent. The local servers may then communicate with physically distant servers using high-speed network infrastructure, e.g., internet backbone network(s), that otherwise might not be directly available to client devices 220-240 themselves. Additionally, the system 200 is not limited to implementations involving one email provider and can include multiple email providers communicating between one another. For example, a first user on a first client device could draft and send an email using a first email provider while a second user on a second client device could receive and interact with the email using a second email provider. The different email providers can communicate between one another using any methods known in the art.

In an example operation for sending an email, initially a user accesses an email client (for a given email provider) through one of the client devices 220, 230, 240 and composes an email to be sent to another user's email address (e.g., user@domain.com). Thereafter, the email is sent by the client device 220, 230, 240 to an outgoing mail server, such as the SMTP server 206. The SMTP server 206 communicates with a DNS server to find the destination address (e.g., internet protocol (IP) address) for the email address (e.g., domain.com). The DNS server can also check to see if the domain has any mail exchange servers. The SMTP server 206 can use the destination address to transmit the message to the target domain's mail exchanger (MX) server. The exchange server can be a MTA 208, that determines where exactly to send the email, to be retrieved by a client device 220, 230, 240. The client device 220-240 can retrieve the email using, for example, POP or IMAP protocols on the POP/IMAP server 204.

In an example operation for receiving an email, a receiving email server will check the email to ensure that the email is not malicious or spam. One way of checking an email is to verify the sender of the email by querying the email message. If the email is determined to be sent from a legitimate source, the email will be provided for access by a user. A user can access their email, using a client device 220, 230, 240, through the email provider's MTA 210. The MTA 210 can be a client-based MTA accessed through email software (e.g., Outlook) or a web-based MTA accessed through a web browser (e.g., Gmail). The email provider 202 can perform the above-noted steps involved in sending and/or receiving emails.

When a client device 220-240 first contacts the email provider 202 in this example, it is routed to a network services server 214. The client device 220, 230, 240 may then provide access credentials for a user, e.g., a username and password or single sign-on credentials, to gain authenticated access to the email provider 202. This process may involve the network services servers 214 contacting a user identity provider 215 to verify the provided credentials. Once the user's credentials have been accepted, the client device 220, 230, 240 may perform administrative functionality, like updating user account information, if the user has an identity with the email provider 202.

Continuing with FIG. 2, the system 200 may include one or more data stores 216 for managing various collections of data, databases, algorithms, etc. For example, the one or more data stores 216 can store data for managing the plurality of software bots 104, data related to users and/or vendors, etc. The one or more data stores 216 can include any combination of computing devices configured to store and organize a collection of data. For example, one or more data stores 216 can be a local storage device on one or more of the client devices 220-240 or on or more of the servers 204-208, a remote database facility, or a cloud computing storage environment. The different components of the system 200 can communicate and otherwise share data with the one or more data stores 216 over any combination of local buses, the network 120 and the PSTN 130. The one or more data stores 216 can also include a database management system utilizing a given database model configured to interact with a user for analyzing the database data.

It should be appreciated that the components of the email provider 202 discussed above are merely examples of such devices and an example architecture. Some email providers may provide more or less functionality than described above and may not separate functionality into different types of servers as discussed above. Instead, any suitable servers and network architectures may be used according to different examples.

Referring now to FIG. 3, FIG. 3 shows an example graphical user interface (GUI) 300 that a client device, e.g., client devices 220-240, may display while interacting with email provided through the system 200. A client device accesses a client-based MTA accessed through email software (e.g., Outlook) or a web-based MTA accessed through a web browser (e.g., Gmail), which in turn displays the GUI 300 on the client device's display. In this example, the GUI 300 depicts an email provider interface 302 with an open email message 304 is being displayed. The email message 304 can be displayed as a pop-up or within a window within the email provider interface 302 in response to a user selecting one of their email messages. The email provider interface 302 can take the form or any email interface depending on the email provider that the user is accessing. For example, if the user is using an email client such as Outlook it may display the message 304 differently than if the user is using a web-based email like Gmail. Regardless of the email provider being accessed by the user, the contents of the email message 304 can be displayed to the user.

The email message 304, as depicted in FIG. 3, is an example of an email message generated and/or provided by a vendor or service provider utilizing the system 100 of the present disclosure. The email message 304 can include any combination of features and characteristics as would be provided within a traditional email message. Example features and characteristics of an email message 304 may include, but is not limited to, text, images, videos, weblinks, etc. Similarly, the email message 304 may include other traditional characteristics found in an email. For example, as depicted in FIG. 3, the email message 304 can include a body with text, a subject line, an address bar showing sender (and other recipients) of the email, etc.

In some embodiments, the email message 302 can include a button 306 to launch a software bot to perform one or more transactions in accordance with the present disclosure. The button 306 can be conveyed to the user in any combination of graphics, text, etc. that may be desirable by the sending party of the email. For example, as depicted in FIG. 3, the button 306 can be a graphical square with text "Perform Transaction" depicted thereon. In some embodiments, the email provider interface 302 can include a profile button or menu 310 for accessing the user's profile, settings, preferences, etc. In some embodiments, the email message 302 can include a button or link 308 to setup and/or install a software bot to perform one or more transactions in accordance with the present disclosure. The button or link 308 can be conveyed to the user in any combination of graphics, text, etc. that may be desirable by the sending party of the email. For example, as depicted in FIG. 3, the button or link 308 can be a graphical square with text "Setup or install Bot for domain.com." depicted thereon. In some embodiments, the button or link 308 can also be used to configure a previously setup software bot 104. For example, a user can use the button or link 308 to setup login credentials to be used at domain.com, payment information to be used at domain-.com, address information to be associated with domain.net, etc.

Referring now to FIG. 4A, FIG. 4A shows an example graphical user interface (GUI) 400 that a client device, e.g., client devices 220-240, may display while interacting with a user profile 312 for configuring one or more software bots in accordance with the present disclosure. An example user profile 312 is depicted within a GUI 400. The user profile 312 can be accessed using any combination of mechanisms. For example, the GUI 400 can be opened in response to a user selecting the profile button or menu 310 from FIG. 3. The user profile 312 can include any combination of settings for controlling user preferences and security for their email account. In some embodiments, the user profile can include a menu for software bot preferences 314. The software bot preferences 314 menu can include settings and preferences for a user's preference related to the usage of software bots. In some embodiments, the software bot preferences 314 menu can include a list of available software bots that a user can select to enable to their service(s).

In some embodiments, the GUI 400 can provide settings for bill pay or auto-payment for a number of different vendors, with each of the different vendors offering different levels of bot services. For example, as depicted in FIG. 4A, the user can select any combination of Vendor #1 Payment Bot, Vendor #2 Payment Bot, and Vendor #3 Multi-Bot (including options for Pay Bill, Activate Auto-Pay, and Recurring Subscription) for multiple bot services.

Figure 4B:
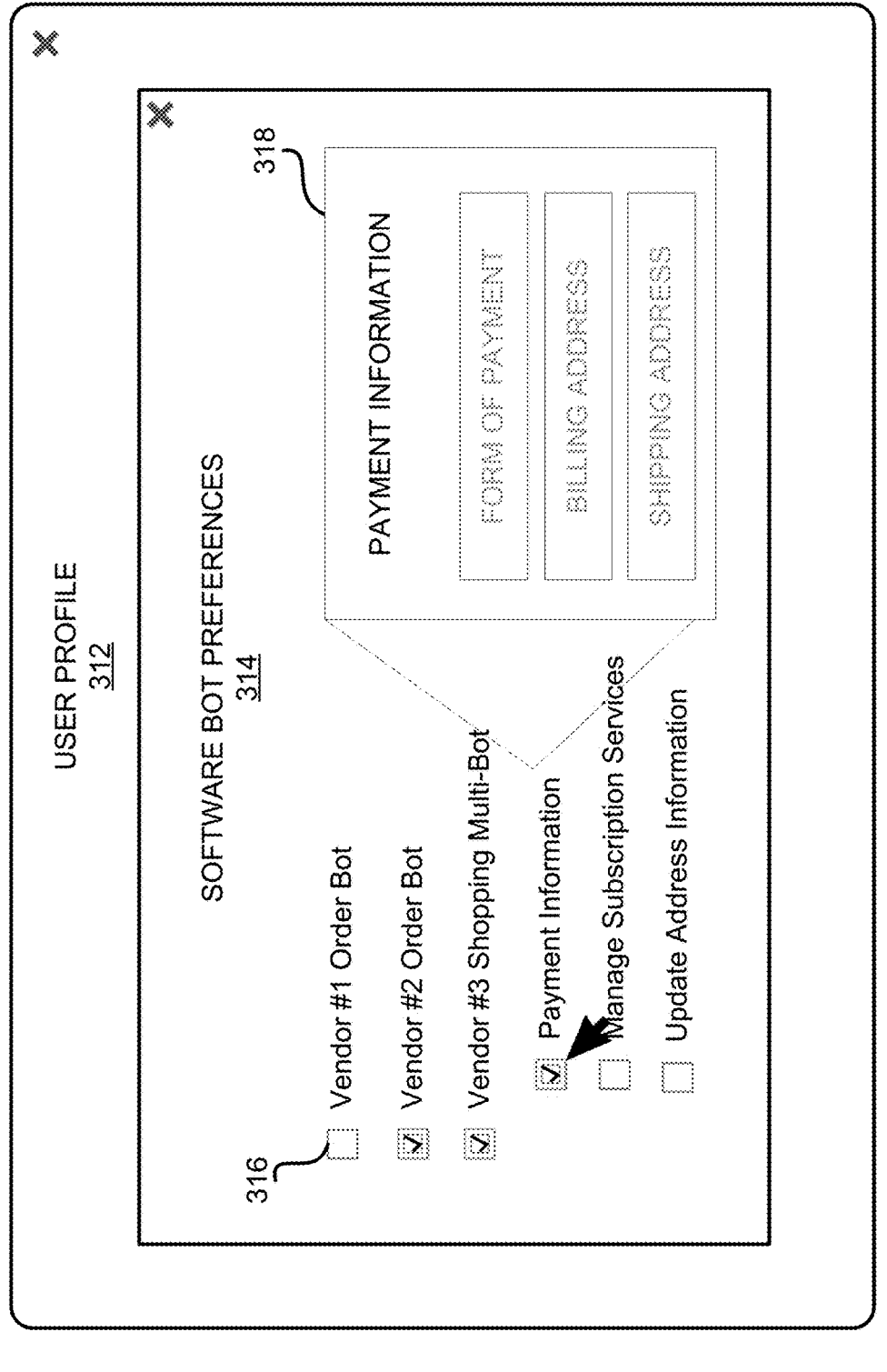

In some embodiments, the GUI 400 can provide settings for shopping or subscription services at different vendors, with each of the different vendors offering different levels of bot services. For example, as depicted in FIG. 4B, the user can select any combination of Vendor #1 Order Bot, Vendor #2 Order Bot, and Vendor #3 Shopping Multi-Bot (including options for Payment information, Managing Subscription Services, Updating Address Information (e.g., billing, shipping, etc.) for multiple bot services. Other examples, not depicted, can include monitoring services, status updates, reporting services, etc. for any combination of industries that require users to access a website to perform a number of steps to complete a transaction. For example, transactions can include processing transactions related to industries such as gaming, stocks, social media, etc.

The selectable options in the software bot preferences 314 menu can include any number of software bots 104 with any combination of options associated therewith. Then software bots 104 can be added to the user profile 312 by the user and/or they can be added as part of an agreement with an email provider 202. In some embodiments, selection of one of the software bots 104 or software bot functionality can cause a credentials menu 318 to be displayed. The credentials menu 318 can include settings and inputs needed from the user for the software bot to automate the selected transaction. For example, as depicted in FIG. 4A, the user can select Pay Bill software bot functionality and a credentials menu 318 for Vendor #3 will be displayed with input fields for username and password for accessing the website for Vendor #3 and a payment field for preferred form of payment. In some embodiments, the credentials including login information, payment information, etc. can be saved/ linked to the user's email account for future use. The options in the software bot preferences 314 menu can change depending on the vendor services/software bots that have configured, selected, download, etc. by the user. Similarly, the types of selections, menus, pop-ups, etc. can vary from what is depicted in FIGS. 3, 4A, and 4B, which are not intended to be limiting. For example, instead of checkboxes depicted in FIGS. 4A and 4B, the different software bots can be associated with drop down menus. In some embodiments, the system can include an intermediate software bot 104 which is mapped to a user and may perform the job of an intermediary for authenticating the user and reaching out to the service provider and also.

Figure 5A:
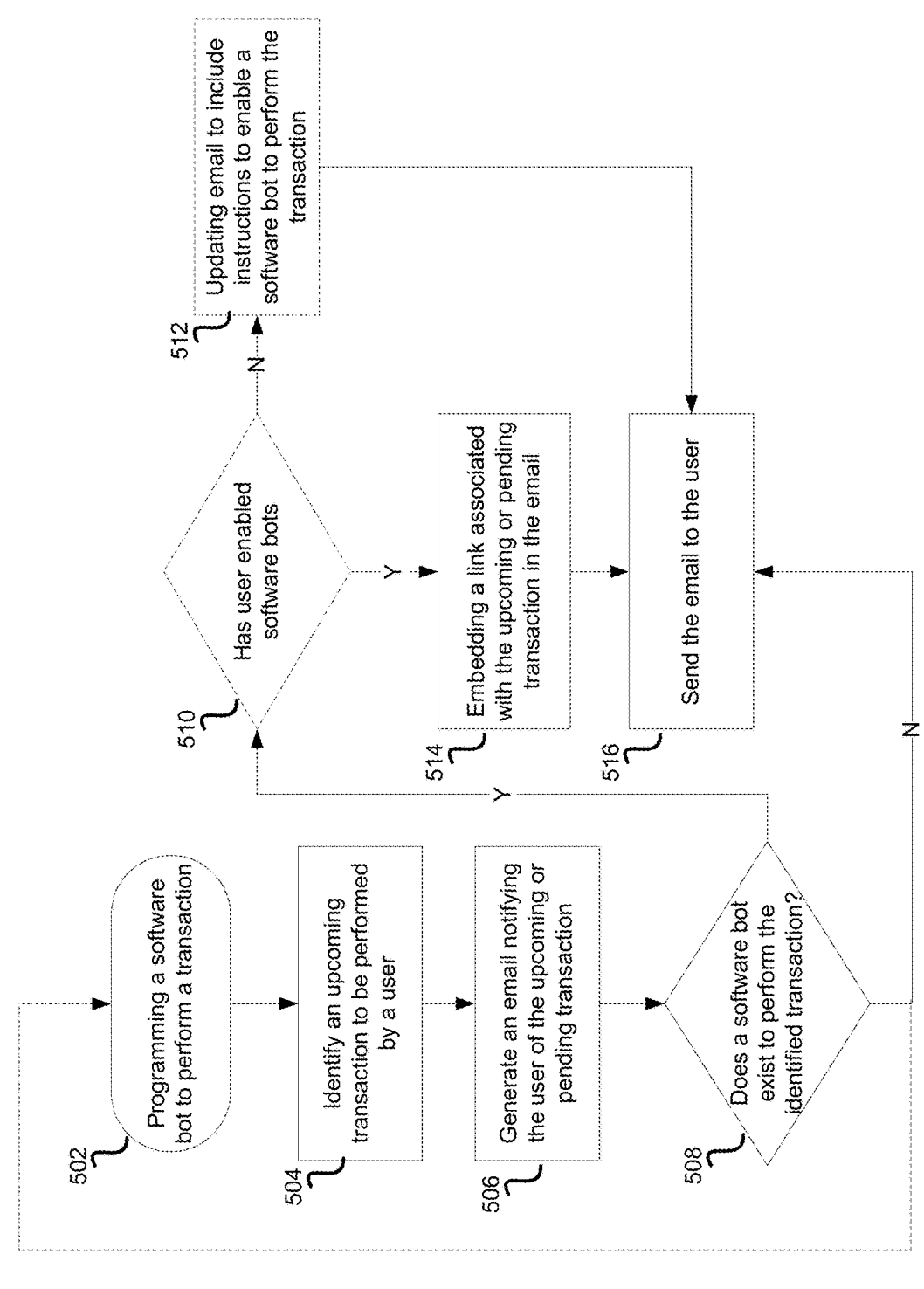

Referring now to FIG. 5A, FIG. 5A shows an example process 500 for creating a software bot and generating an email for activating the software bot to automate a given transaction. The method 500 of FIG. 5A will be described with respect to the system 100 shown in FIG. 5A while referencing the GUIs in FIGS. 3-4; however, any suitable systems and GUIs according to this disclosure may be employed. In one example, the blocks provided in process 500 can be performed by any combination of the vendor server 106, bot engine 110, or one or the client devices 140-160.

At block 502, the process 500 programs one or more software bots 104 to perform one or more transactions at a vendor website or application. The one or more software bots 104 can be programmed using any combination of programming languages and can include any combination of steps needed to complete a transaction in an automated format. The one or more software bots 104 can be specifically designed by vendors (e.g., goods or service providers) to carry out one or more transactions. Separate software bots 104 can be programmed for each different transaction to be automated or a single software bot 104 can be programmed to perform multiple transactions. The transactions can include any combination of transactions that would normally be completed by a user following manual steps. For example, the software bots 104 can be programmed to automatically log into a user's account at the vendor's website, navigate through one or more menus within the vendor's website, autofill any fields needed to complete a transaction, and submit the transaction without or with minimal user involvement. The software bots 104 can be programed, by service provider, to navigate webpages to execute the transactions or through exchanges with the backend of the server. The software bots 104 can also be programs to open browser or other apps to automatically perform a transaction. Once created, the software bots 104 can be hosted by vendor or through a third-party provider, such as for example, a software bot cloud service.

At block 504, the process 500 identifies an upcoming transaction to be performed by a user. The upcoming transaction can include transactions that the user has to perform as part of an arrangement with the vendor. For example, the pending transactions can include upcoming due dates for payment for goods or services provided by the vendor to the user. The upcoming transaction can be identified using any combination of methods. For example, the process 500 can query one or more databases or tables of upcoming transactions for every user account associated with the vendor. Once an upcoming transaction is identified it can be tagged to be included in an email to a user.

At block 506, the process 500 generates an email notifying the user of the upcoming or pending transaction. In some embodiments, the email includes general information about the transaction being performed. For example, the email can include an automatically generated message such as the message included in FIG. 3. The email and the message can be generated using any combination of techniques. In one example, the email can be automatically generated using a template and filling in the information from the identified transaction for a given user. This can include populating the target email address(s) for a user associated with the identified transaction, populating a subject line indicating the type of transaction being reported, and populating the body of the email with additional information about the transaction being reported.

At block 508, the process 500 determines whether a software bot 104 exists for each of the identified upcoming transactions. The determination can be performed using any combination of steps. In some embodiments, each transaction can include a tag indicating a type of the transaction. For example, types of transactions can include payment, purchase or goods or services, completing a contract (e.g., providing signature, filling in address information, etc.), profile/preference updates, etc. The tag for identified transactions can be compared against the type tags for the registered software bots 104. If a software bot 104 does not exist for automating the transaction (e.g., the transaction type), the process 500 can advance to block 516. If a software bot 104 does exist for automating the transaction (e.g., the transaction type), the process 500 can advance to block 516. Optionally, the process 500 can also advance to block 502 with a notification or request to create a new software bot 104 for the type of transaction, for future instances of that transaction type.

Block 510 can be an optional step which can be bypassed directly to step 514. At block 510, in some embodiments, the process 500 can determine whether the user has enabled software bots 104 or whether the user (e.g., target recipient for the identified transaction) has enabled a particular software bot. The determination can be made using any combination of methods. In one example, when a user downloads, activates, enables, etc. a software bot 104, a registration message can be provided to the process 500 to indicate that the user has enabled that software bot 104. If the process 500 determines that a user has not enabled the software bots 104 or a particular bot, the process 500 advances to block 512. If the process 500 determines that a user has enabled the software bots 104 or a particular bot, the process 500 advances to block 514.

At block 512, the process 500 updates the email to include instructions to enable a software bot 104 to perform the transaction automatically. The email can be updated, for example, by automatically populating an additional field including an explanation of what the software bots are and instructions for how to activate the software bots.

At block 514, the process 500 embeds a link associated with the upcoming or pending transaction in the email. Embedding the link can include adding a link or other function call that will cause one or more software bots 104 to activate in response to receiving a selection by a user (e.g., via client device). In some embodiments, the link can include a unique transaction identifier associated with an identified transaction. The unique transaction identifier can be used by the called software bot 104 to automatically complete the appropriate transaction (e.g., the transaction associated with the unique transaction identifier).

At block 516, the process 500 sends the email to the user (e.g., target recipient for the identified transaction). The email can be sent using any combination of methods, for example, as discussed with respect to FIG. 2.

Figure 5B:
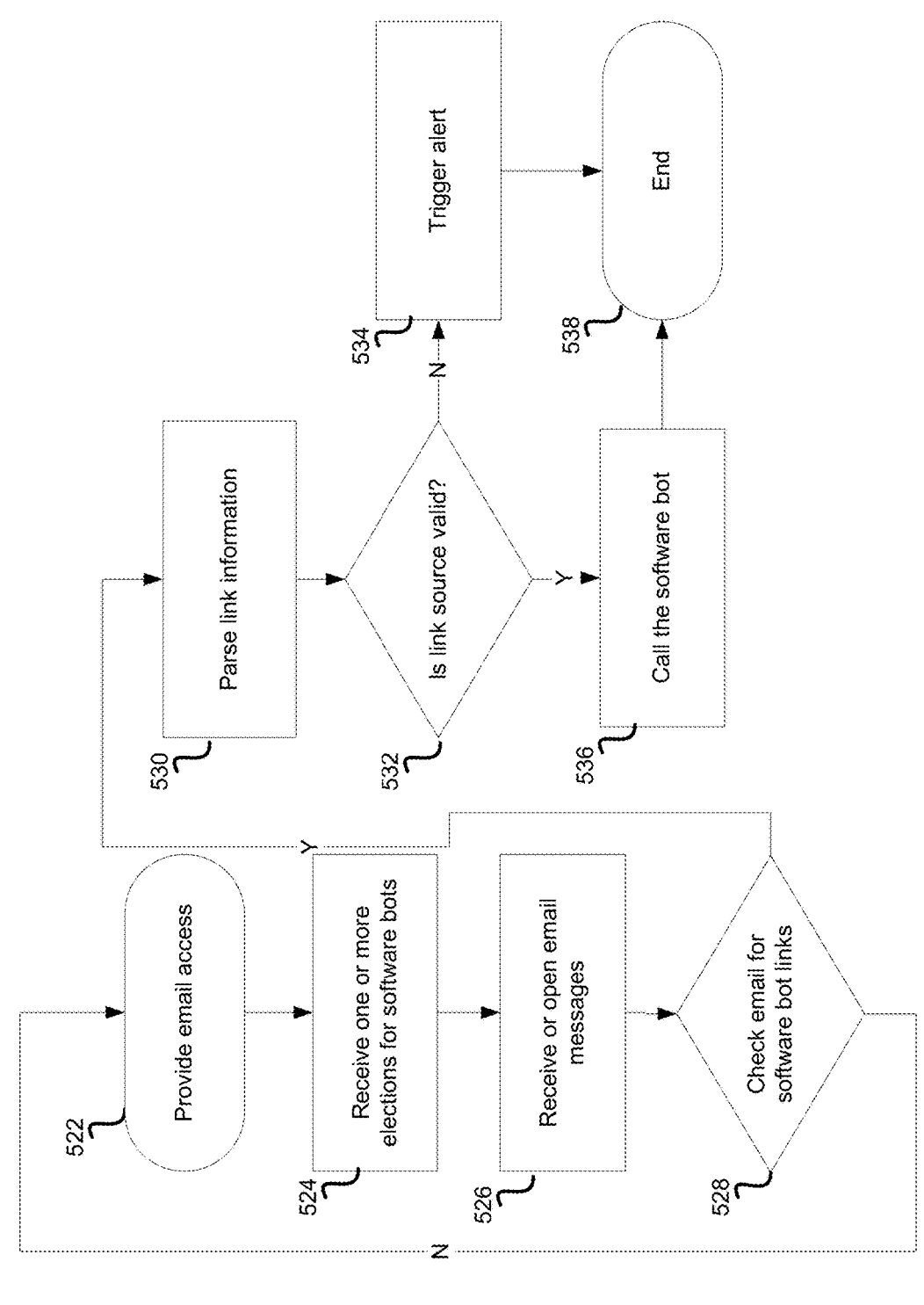

Referring now to FIG. 5B, FIG. 5B shows an example process 520 for an email provider 102 enabling software bots 104 and activating the software bots 104 through email. The method 500 of FIG. 5B will be described with respect to the system 100 shown in FIG. 5B while referencing the GUIs in FIGS. 3-4; however, any suitable systems and GUIs according to this disclosure may be employed. In one example, the blocks provided in process 520 can be performed by any combination of the email provider 102 or one or the client devices 140-160.

At block 522, the process 520 provides email access to users. The email access can be provided by the email provider 102 through a program or through a web-application and users can log into their email account to review emails addressed to the user's email address.

At block 524, process 520 receives one or more elections for software bots 104. The elections for the software bots 104 can include receiving user preferences related to which software bots 104 to enable and/or which features of enabled software bots 104 to enable. The elections can be received through any combination of methods, for example, the elections can be pulled from a user profile (e.g., as shown in FIGS. 4A and 4B) saved within the email provider 102. In some embodiments, the elections can also include receiving one or more inputs from the user required to make user of the enabled software bots 104. For example, user credentials may be required to log into a vendor's website for automating a transaction using the website.

At block 526, process 520 receives new email messages or receives a request to open a previously received email message. The messages can be received by the email provider 102 using any combination of methods, for example, as discussed with respect to FIG. 2.

At block 528, the process 520 checks email messages for links related to one or more software bots 104. The process 520 receives can perform the checks as email messages are received and/or when the email messages are opened by a user. The checks can be performed by scanning the email message for links and identifying links as being associated with one or more software bots 104. If the process 520 determines that there are not any links for software bots 104, then the email can be opened as normal and can advance to block 522. If the process 520 determines that there are one or more links for software bots 104, then the email can be opened as normal and can advance to block 530.

At block 530, the process 520 parses link information. The link information can be parsed to determine a combination of information needed to automate a transaction using one or more software bots 104. For example, the link information can include a source of the link, a unique transaction identifier for the link, a bot information of the link, etc. The parsing can include extracting information form the link itself and/or meta data associated with the link. For example, the link can be broken down into parts (e.g., scheme, sub domain, domain, top level domain, port number, path, query string, parameter, fragment, etc.) and information can be pulled and organized accordingly. The link itself can include the unique identifier and bot to call, for example, using a combination of a domain, a query string parameter, and the fragment.

At block 532, the process 520 determines whether the link source is sanitized, verified and/or valid. The verification and/or validation can be performed using any combination of techniques. In some embodiments, the email provider 102 (e.g., security engine 108) can be responsible for checking all incoming email messages and determine whether those emails are originating from a verified and/or valid source. The email provider 102 can also perform other security inspections on incoming emails for security purposes. For example, the email provider 102 can perform link sanitization to avoid phishing attempts and warn users when the link is malicious. Once the security, verification, and validation processes are performed on the email message itself and the contained link, the process 532 can determine whether the link is trusted. If the source of the email or the link is determined to be untrustworthy, the process 520 advances to block 534. Otherwise, if the source of the email and the link are trustworthy, then the process 520 advances to block 536.

At block 534, the process 520 triggers an alert message. The alert message can be designed to convey to a user the error(s) that have occurred related to the opened email message. For example, if the process 520, at block 532, determines that the source of the email message is not verified, then a message indicating that the source of the email originates from an untrusted source can be presented to the user. In some embodiments, the untrusted email can be sent to a spam folder. Thereafter, the process 520 can advance to block 538.

At block 536, the process 520 issues a call to the software bot 104 associated with the link. As part of the call, the software bot 104 can receive the unique transaction identifier sent by the vendor, authentication details of the user, and identify the action being performed so that the software bot 104 can complete the transaction.

In some embodiments, prior to calling the software bot 104, the process 520 can check to see if that particular software bot 104 is enabled. The enable check can be performed using any combination of methods, for example, checking the user preferences/profile saved by the email provider 102.

At block 538, the process 520 ends and/or returns to block 522.

In some embodiments, all the actions in the process 520 can be executed while the user is accessing their email, or some may be performed when an email for the user arrives at the email provider, but before the user attempts to access new emails. Additionally, the user can continue to check other emails while the software bot 104 executes the indicated transactions. The software bot 104 should be capable of running in the background if so desired by the user and should not interfere with other activities the user is performing. Although FIG. 5B is discussed with respect to implementing the steps of process 520 through an email or email provider, any combination of sources could be used to carry out the steps of process 520. For example, the process 520 can be implemented on a client device, through an application, mobile app, etc.

Referring now to FIG. 5C, FIG. 5C shows an example process 550 for activation of one or more of the software bots 104 and how the software bot 104 complete an automated transaction. The method 550 of FIG. 5C will be described with respect to the system 100 shown in FIG. 5C while referencing the GUIs in FIGS. 3-4; however, any suitable systems and GUIs according to this disclosure may be employed. In one example, the blocks provided in process 550 can be performed by software bots 104.

At block 552, the process 550 receives a call to initiate one or more software bots 104, for example, as discussed with respect to block 536. In some embodiments, the call can be received from an email provider 102 in response to a user selecting a button or link 306 to perform an automated transaction. The call can include any combination of inputs to cause a software bot 104 to run its predetermined sequence of steps.

At block 554, the process 550 receives or otherwise obtains any information related to the call to initiate one or more software bots 104, for example, via the link as a URL parameter. The information can include any combination of data needed for the software bot 104 to complete the transaction. For example, the information can include user credentials, account information, payment information, user feedback, etc. The process 550 can check the link information to determine if all the necessary information is provided for the software bot 104 to run without issue. If there is missing information, a notification (e.g., email, SMS, etc.) can be sent to the user, associated with the call, to provide the missing information. Once all the necessary information is received or otherwise obtained, the process 550 can store and/or provide the information to the appropriate software bot 104.

At block 556, the software bot 104 can perform automation of the transaction. To perform the automated transaction, the software bot 104 can execute the step-by-step specialized programing for the selected transaction. The software bot 104 can use the information from block 554 to complete the transaction. In some embodiments, the software bot 104 can confirm the type of transaction being requested and determine whether the transaction includes unique transaction identifier from a trusted source (e.g., email provider 102). The software bot 104 should know about supported email providers that offer the functionality of the present disclosure to provide a secure transaction. In some embodiments, software bot 104 can establish a secure communication channel between the software bot 104 and the email provider 102 and/or the software bot 104 can and the vendor server 106 throughout completion of the automated transaction. The secure communication can be established using any combination of encryption, secure networking, etc.

At block 558, the process 550 can determine whether the automation transaction was successful. The determination can include receiving a status report from the software bot 104 indicating whether the transaction was successful or whether the software bot 104 encountered an error. In other instances, the vendor or vendor server 106 can provide the process 550 with confirmation that a transaction has been completed. If the transaction was unsuccessful, the reason for the failure can be logged and the process 550 can advance to block 560.

At block 560, the process 550 can determine whether the failure of the transaction was due to a programming error or a lack of information. If a programming error, then a notification can be sent the administrator and/or creator of the software bot 104 with the error. If a lack of information or incorrect information was the cause of the failure, then a request for updated information can be sent to the user associated with the transaction. Once the information is provided, the user can try to initiate the automated transaction again, for example, by clicking the button 306 in the email.

At block 562, the process 550 can report transaction status to the requesting user via email. Regardless of if the transaction was successfully completed or not, the status can be provided to the user for their records. In some embodiments, the status is provided to the same email address that the user originally initiated the transaction from, although other reporting mediums could also be used.

In an example operation, the software bot 104 can receive the transaction identifier indicating a sum of $1000 is due. The software bot 104 can receive the unique transaction identifier and optionally authenticate the user. Then the software bot 104 reaches out to the vendor server, that completes the transaction. Lastly, the vendor sends an acknowledgement informing the user of competition of the transaction and emails the user with the details and confirmation.

Figure 6:
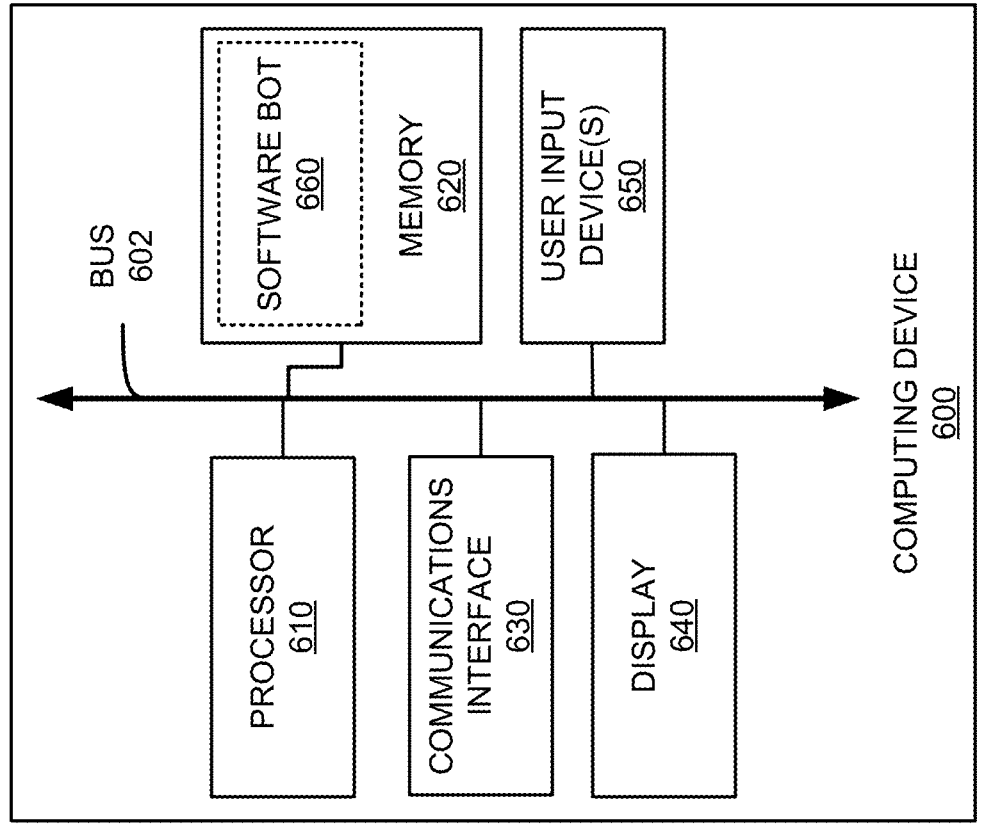
FIG. 6 shows an example computing device suitable for use with systems and methods in accordance with various embodiments.

Referring now to FIG. 6, FIG. 6 shows an example computing device 600 suitable for use in example systems or methods for referencing an identifier for another user in chat. The example computing device 600 includes a processor 610 which is in communication with the memory 620 and other components of the computing device 600 using one or more communications buses 602. The processor 610 is configured to execute processor-executable instructions stored in the memory 620 to perform one or more methods for autocompleting references and creating reference links according to different examples, such as part or all of the example method 400 and GUI 500 described above with respect to FIGS. 4A and 4B and FIGS. 5A-5H. The computing device 600, in this example, also includes one or more user input devices 450, such as a keyboard, mouse, touchscreen, microphone, etc., to accept user input. The computing device 600 also includes a display 640 to provide visual output to a user.

In addition, the computing device 600 includes a software bot and/or software bot configuration/settings 660 to enable a user to setup, install, access, etc software bots to perform one or more transactions in an automated fashion. such as described throughout this disclosure, etc.

The computing device 600 also includes a communications interface 640. In some examples, the communications interface 430 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method for automating a transaction, the method comprising:
receiving, from a third-party service provider by a client device, an email message notifying a user associated with the client device of an upcoming transaction associated with the third-party service provider, the email message including a link to a software bot programmed to automate the upcoming transaction, wherein the software bot is associated with the third-party service provider, wherein the software bot is configured to query one or more databases of upcoming transactions to identify the upcoming transaction associated with the user associated with the client device, wherein the link comprises a unique identifier associated with the upcoming transaction;
receiving, by the client device, a selection of the link to the software bot;
issuing, by the client device, a call to the software bot to execute the upcoming transaction; and
receiving, by the client device, confirmation of completion of the upcoming transaction from the software bot.

2. The method of claim 1, further comprising receiving and storing, by the client device, user credentials for accessing a website associated with the third-party service provider in a user profile.

3. The method of claim 2, further comprising, in response to receiving a request for the user credentials for logging into the website, providing, by the client device, the user credentials from the user profile to the software bot for access to a user account to execute the upcoming transaction.

4. The method of claim 2, further comprising:
receiving one or more requests for data from the website;
obtaining the data from the user profile; and
providing the data to the website to complete the upcoming transaction.

5. The method of claim 1, further comprising enabling, by the client device, the software bot from a plurality of available software bots.

6. The method of claim 1, further comprising verifying, by the client device, that the email message is from a secure source.

7. The method of claim 1, further comprising allowing, by the client device, a user to browse email messages while the software bot automatically completes the upcoming transaction on behalf of the user.

8. A system comprising:
one or more processors; and
a memory coupled to the one or more processors, the memory storing a plurality of instructions executable by the one or more processors, the plurality of instructions comprising instructions that when executed by the one or more processors cause the one or more processors to:
receive, from a third-party service provider, an email message notifying a user associated with a client device of an upcoming transaction associated with the third-party service provider, the email message including a link to a software bot programmed to automate the upcoming transaction, wherein the software bot is associated with the third-party service provider, wherein the software bot is configured to query one or more databases of upcoming transactions to identify the upcoming transaction associated with the user associated with the client device, wherein the link comprises a unique identifier associated with the upcoming transaction;

receive a selection of the link to the software bot;

issue a call to the software bot to execute the upcoming transaction; and receive confirmation of completion of the upcoming transaction from the software bot.

9. The system of claim 8, wherein the plurality of instructions further comprises instructions that when executed by the one or more processors cause the one or more processors to receive and store user credentials for accessing a website associated with the third-party service provider in a user profile.

10. The system of claim 9, wherein the plurality of instructions further comprises instructions that when executed by the one or more processors cause the one or more processors to, in response to receiving a request for the user credentials for logging into the website, provide the user credentials from the user profile to the software bot for access to a user account to execute the upcoming transaction.

11. The system of claim 9, wherein the plurality of instructions further comprises instructions that when executed by the one or more processors cause the one or more processors to:

receive one or more requests for data from the website;

obtain the data from the user profile; and provide the data to the website to complete the upcoming transaction.

12. The system of claim 8, wherein the plurality of instructions further comprises instructions that when executed by the one or more processors cause the one or more processors to enable the software bot from a plurality of available software bots.

13. The system of claim 8, wherein the plurality of instructions further comprises instructions that when executed by the one or more processors cause the one or more processors to verify that the email message is from a secure source.

14. The system of claim 8, wherein the plurality of instructions further comprises instructions that when executed by the one or more processors cause the one or more processors to a user to browse email messages while the software bot automatically completes the upcoming transaction on behalf of the user.

15. A non-transitory computer-readable memory storing a plurality of instructions executable by one or more processors, the plurality of instructions comprising instructions that when executed by the one or more processors cause the one or more processors to:

receive an email message notifying a user associated with a client device of an upcoming transaction, the email message including a link to a software bot programmed to automate the upcoming transaction, wherein the software bot is associated with a third-party service provider, wherein the software bot is configured to query one or more databases of upcoming transactions to identify the upcoming transaction associated with the user associated with the client device, wherein the link comprises a unique identifier associated with the upcoming transaction;

receive a selection of the link to the software bot;

issue a call to the software bot to execute the upcoming transaction; and receive confirmation of completion of the upcoming transaction from the software bot.

16. The non-transitory computer-readable memory of claim 15, wherein the plurality of instructions further comprises instructions that when executed by the one or more processors cause the one or more processors to:

receive user credentials for accessing a website associate with the third-party service provider in a user profile; and in response to receiving a request for the user credentials for logging into the website, provide the user credentials from the user profile to the software bot for access to a user account to execute the upcoming transaction.

17. The non-transitory computer-readable memory of claim 16, wherein the plurality of instructions further comprises instructions that when executed by the one or more processors cause the one or more processors to:

receive one or more requests for data from the website;

obtain the data from the user profile; and provide the data to the website to complete the upcoming transaction.

18. The non-transitory computer-readable memory of claim 15, wherein the plurality of instructions further comprises instructions that when executed by the one or more processors cause the one or more processors to enable the software bot from a plurality of available software bots.

19. The non-transitory computer-readable memory of claim 15, wherein the plurality of instructions further comprises instructions that when executed by the one or more processors cause the one or more processors to verify that the email message is from a secure source.

20. The non-transitory computer-readable memory of claim 15, wherein the plurality of instructions further comprises instructions that when executed by the one or more processors cause the one or more processors to allow a user to browse email messages while the software bot automatically completes the upcoming transaction on behalf of the user.

* * * * *